(12) United States Patent
Akiyoshi et al.

(10) Patent No.: US 9,479,028 B2
(45) Date of Patent: Oct. 25, 2016

(54) AUTOMOTIVE ROTARY ELECTRIC MACHINE

(71) Applicant: MITSUBISHI ELECTRIC CORPORATION, Tokyo (JP)

(72) Inventors: Masao Akiyoshi, Tokyo (JP); Yuzuru Kobayashi, Tokyo (JP); Kazunori Tanaka, Tokyo (JP); Yoshihiro Shinosaka, Tokyo (JP); Yoshiro Imazawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 187 days.

(21) Appl. No.: 14/403,463

(22) PCT Filed: Jun. 26, 2013

(86) PCT No.: PCT/JP2013/067545
§ 371 (c)(1),
(2) Date: Nov. 24, 2014

(87) PCT Pub. No.: WO2014/003065
PCT Pub. Date: Jan. 3, 2014

(65) Prior Publication Data
US 2015/0171708 A1 Jun. 18, 2015

(30) Foreign Application Priority Data
Jun. 28, 2012 (JP) ................. 2012-145178

(51) Int. Cl.
*H02K 9/06* (2006.01)
*H02K 9/22* (2006.01)
*H02K 11/04* (2016.01)

(52) U.S. Cl.
CPC *H02K 9/06* (2013.01); *H02K 9/22* (2013.01); *H02K 11/046* (2013.01)

(58) Field of Classification Search
CPC .......... H02K 9/06; H02K 9/22; H02K 11/046
USPC .... 310/58, 60 A, 68 D; 416/183, 185, 223 R
IPC ..................................... H02K 9/06, 9/22, 11/04
See application file for complete search history.

(56) References Cited

U.S. PATENT DOCUMENTS 4,184,804 A    1/1980  Inagaki et al.
5,241,230 A *  8/1993  Tanaka .................. F04D 29/281
                                              29/889.7

(Continued)

FOREIGN PATENT DOCUMENTS

EP    1193398 A2    4/2002
JP    05-336704 A   12/1993

(Continued)

OTHER PUBLICATIONS

Communication dated Mar. 16, 2016 from the European Patent Office issued in corresponding Application No. 13808637.6.

(Continued)

*Primary Examiner* — John K Kim
(74) *Attorney, Agent, or Firm* — Sughrue Mion, PLLC; Richard C. Turner (57) ABSTRACT

An automotive rotary electric machine has a cooling fan including a flat ring-shaped mounting base plate fixed to a rotor, and a plurality of fan blades arranged in a row circumferentially such that each stands on a surface of the mounting base plate, the fan blades having an S-shaped cross-sectional shape that displaces gradually forward in a direction of rotation from a trailing edge that is an outer circumferential edge toward a leading edge that is an inner circumferential edge, and in which an arc shape near the trailing edge that is convex forward in the direction of rotation and an arc shape near the leading edge that is convex rearward in the direction of rotation are connected smoothly.

6 Claims, 6 Drawing Sheets

(56) References Cited

U.S. PATENT DOCUMENTS

| | | | | |
|---|---|---|---|---|
| 5,682,070 A * | 10/1997 | Adachi | ............... | H02K 19/22 310/68 D |
| 6,417,585 B1 * | 7/2002 | Oohashi | ............... | H02K 5/20 310/428 |
| 6,552,463 B2 * | 4/2003 | Oohashi | ............... | H02K 3/12 310/184 |
| 6,791,228 B2 * | 9/2004 | Hashiba | ............... | H02K 3/12 310/180 |
| 6,933,652 B2 * | 8/2005 | Higashino | ............... | H02K 3/38 310/201 |
| 7,345,387 B2 * | 3/2008 | Akita | ............... | H02K 9/06 310/63 |
| 7,589,481 B2 * | 9/2009 | Sonoda | ............... | H02K 11/048 310/10 |
| 7,898,126 B2 * | 3/2011 | Kato | ............... | H02K 9/06 310/52 |
| 9,257,882 B2 * | 2/2016 | Shirai | ............... | H02K 9/06 |
| 2001/0010434 A1 | 8/2001 | Ishida et al. | | |
| 2005/0106024 A1 * | 5/2005 | Vasilescu | ............... | F04D 29/023 416/185 |
| 2007/0188119 A1 * | 8/2007 | Sonoda | ............... | H02K 11/048 318/400.21 |
| 2015/0171708 A1 * | 6/2015 | Akiyoshi | ............... | H02K 9/06 310/60 A |

FOREIGN PATENT DOCUMENTS

| | | |
|---|---|---|
| JP | 2669534 B2 | 10/1997 |
| JP | 2000-083350 A | 3/2000 |
| JP | 2001-218433 A | 8/2001 |
| JP | 2001-333558 A | 11/2001 |
| JP | 2007-028762 A | 2/2007 |
| KR | 10-2010-0133873 A | 12/2010 |

OTHER PUBLICATIONS

Machine translation of JP 5-336704 previously filed Nov. 24, 2014.
International Search Report for PCT/JP2013/067545 dated Jul. 23, 2013.
Written Opinion for PCT/JP2013/067545 dated Jul. 23, 2013.

* cited by examiner

AUTOMOTIVE ROTARY ELECTRIC MACHINE

CROSS REFERENCE TO RELATED APPLICATIONS

This application is a National Stage of International Application No. PCT/JP2013/067545 filed Jun. 26, 2013, claiming priority based on Japanese Patent Application No. 2012-145178 filed Jun. 28, 2012, the contents of all of which are incorporated herein by reference in their entirety.

TECHNICAL FIELD

The present invention relates to an automotive rotary electric machine such as an automotive alternator that has a cooling fan that rotates together with a rotating shaft to air-cool a heat-generating portion.

BACKGROUND ART

Conventional automotive alternators include: a rotor that has: a pair of cores; a rotating shaft that is inserted into and fixed to a central portion of the cores; and excitation current supply slip rings that are fitted onto and fixed to the rotating shaft; a stator that is disposed on an outer circumference of the rotor; and a bracket that is disposed so as to surround the rotor and the stator, the rotor is rotatably supported in the bracket by means of bearings, cooling fans are mounted to two end surfaces of the rotor, a plurality of air intake apertures are disposed on an end portion of the bracket, a plurality of air discharge apertures are disposed on an outer circumferential portion of the bracket, and are configured such that internal portions of the alternator are ventilated and cooled by the cooling fans by rotation of the rotor (see Patent Literature 1, for example).

In these conventional automotive alternator cooling fans, loud noise that has frequencies that are integral multiples of the rotational frequency that arises due to fan blade end surfaces chopping the air has been reduced by mounting ring-shaped fan guides to the fan blade end surfaces on opposite sides from mounting sides ("tip sides"). Fan blade area has also been expanded by extending leading edge positions of the fan blades on the fan mounting side ("hub side") closer to the rotating shaft, and reducing fan height gradually toward the rotating shaft, to increase the fan airflow rate and improve cooling performance. In addition, fan noise has been reduced without reducing the flow rate by giving the trailing edge positions of the fan blades an inclined shape on an air discharge side without changing the trailing edge positions of the fan blades on an opposite side from the mounting side.

CITATION LIST

Patent Literature

Patent Literature 1: Japanese Patent Laid-Open No. 2001-333558 (Gazette)

SUMMARY OF THE INVENTION

Problem to be Solved by the Invention

In conventional automotive alternators, air noise that is generated when air crosses the end portions of the cooling fans and noise that is generated near the trailing edges of the fan blades have been reduced by mounting the ring-shaped fan guides to the fan blade end surfaces on an opposite side from the mounting side, and by adapting the trailing edge shape of the fan blades, but no consideration has been given to noise that is generated near the leading edges of the fan blades. However, if there is turbulence in the air that flows into the cooling fans, pressure fluctuations arise near the leading edges of the cooling fans, generating loud noise.

The present invention aims to solve the above problems and an object of the present invention is to provide an automotive rotary electric machine that can reduce fan noise by suppressing occurrence of pressure fluctuations near leading edges of a cooling fan that become more pronounced due to turbulent air flowing into the cooling fan.

Means for Solving the Problem

In order to achieve the above object, according to one aspect of the present invention, there is provided an automotive rotary electric machine including: a casing; a rotor that is fixed to a rotating shaft that is rotatably supported by the casing, the rotor being disposed inside the casing; a stator that is supported by the casing, and that is disposed so as to surround the rotor; a rectifier that is disposed outside a first axial end of the casing; and a cooling fan that is fixed to an end surface at a first axial end of the rotor. The rectifier includes: a first heatsink including: an arc-shaped first heatsink base that is disposed so as to be coaxial to the rotating shaft; and a plurality of first radiating fins that are arranged in a row circumferentially such that each extends radially inward from an inner circumferential surface of the first heatsink base and also extends axially; a second heatsink including: an arc-shaped second heatsink base that is disposed so as to be spaced apart from the first heatsink base so as to be coaxial to the rotating shaft; and a plurality of second radiating fins that are arranged in a row circumferentially such that each extends radially outward from an outer circumferential surface of the second heatsink base and also extends axially; a plurality of first diodes that are mounted onto the first heatsink base; and a plurality of second diodes that are mounted onto the second heatsink base. An air intake aperture is formed on an end surface at the first axial end of the casing, an air discharge aperture is formed on an outer circumferential portion of the casing, and the cooling fan rotates together with rotation of the rotor such that cooling air flows between the first radiating fins and between the second radiating fins, flows through the air intake aperture into the casing, and is subsequently deflected centrifugally and discharged through the air discharge aperture. The cooling fan includes: a flat ring-shaped mounting base plate that is fixed to the rotor; and a plurality of fan blades that are respectively arranged in a row circumferentially such that each stands on a surface of the mounting base plate, and that each have an S-shaped cross-sectional shape that displaces gradually forward in a direction of rotation from a trailing edge that is an outer circumferential edge toward a leading edge that is an inner circumferential edge, and in which an arc shape near the trailing edge that is convex forward in the direction of rotation and an arc shape near the leading edge that is convex rearward in the direction of rotation are connected smoothly.

Effects of the Invention

According to the present invention, because the cross-sectional shape near the leading edge of the fan blades is an arc shape that is convex rearward in the direction of rotation, the angle on the air inflow side near the leading edge of the fan blades relative to a tangent of a circle that is centered around the central axis of the rotating shaft that passes through the leading edge is reduced. Thus, cooling air that has flowed along the mounting base plate flows in near the leading edges of the fan blades smoothly, suppressing the occurrence of pressure fluctuations near the leading edges of the fan blades. The occurrence of delamination on the negative pressure surface sides of the fan blades near the leading edges is thereby suppressed, and the size of delaminated regions and turbulence inside the delaminated regions, which are noise sources, are reduced, enabling fan noise near the leading edges of the fan blades to be reduced.

DESCRIPTION OF EMBODIMENTS

Preferred embodiments of an automotive rotary electric machine according to the present invention will now be explained with reference to the drawings.
Embodiment 1

Figure 1:
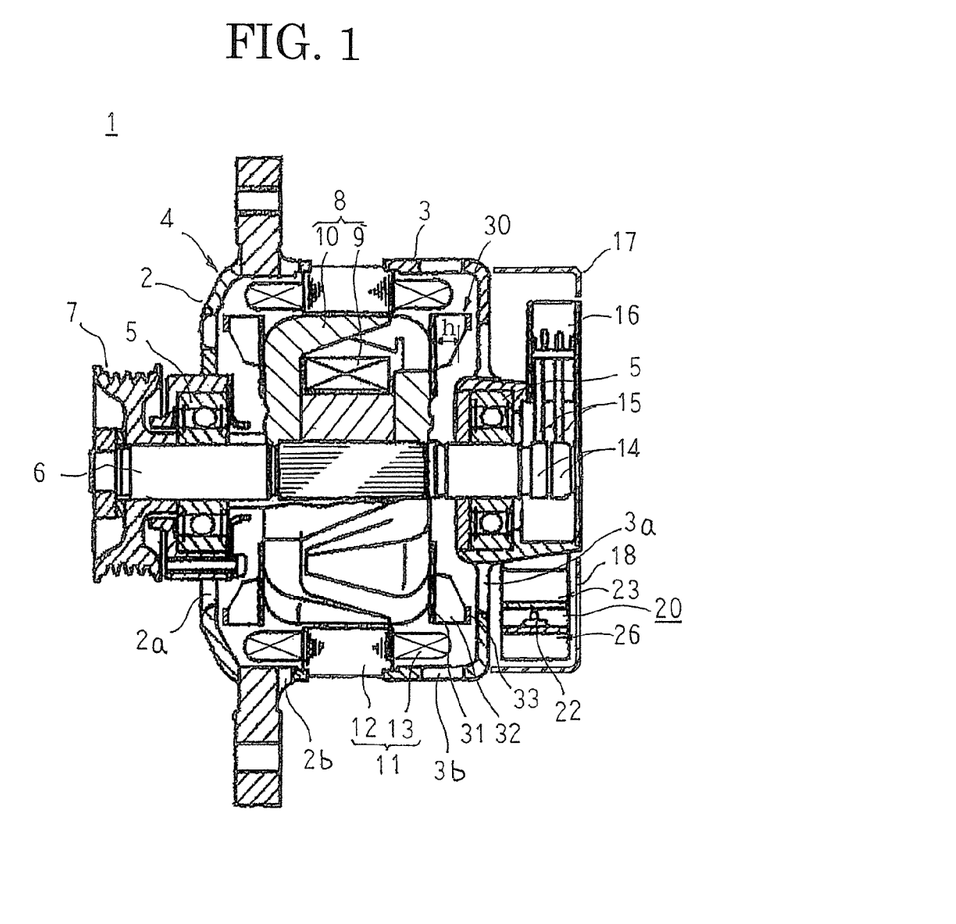
FIG. 1 is a longitudinal cross section that shows an automotive alternator according to Embodiment 1 of the present invention.
Figure 2:
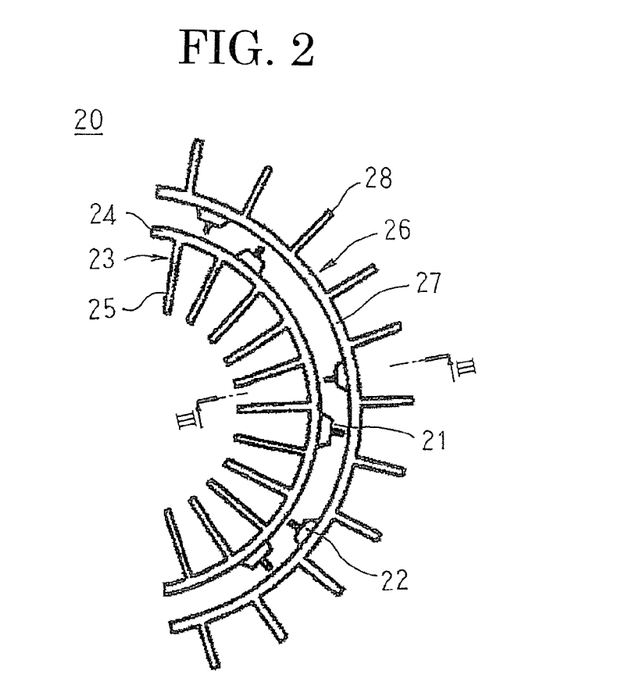
FIG. 2 is an end elevation of a rectifying apparatus in the automotive alternator according to Embodiment 1 of the present invention viewed from an axial direction.
Figure 3:
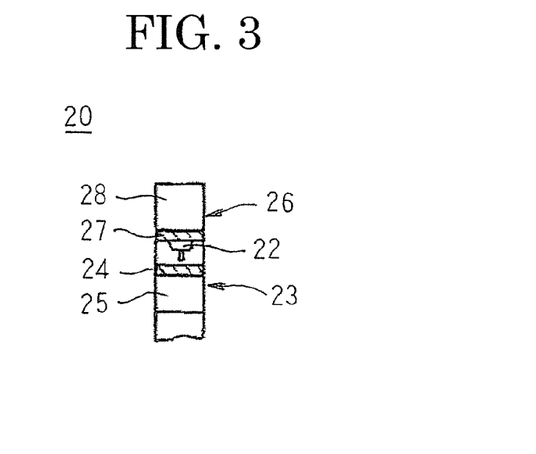
FIG. 3 is a cross section that is taken along line III-III in FIG. 2 so as to be viewed in the direction of the arrows.
Figure 4:
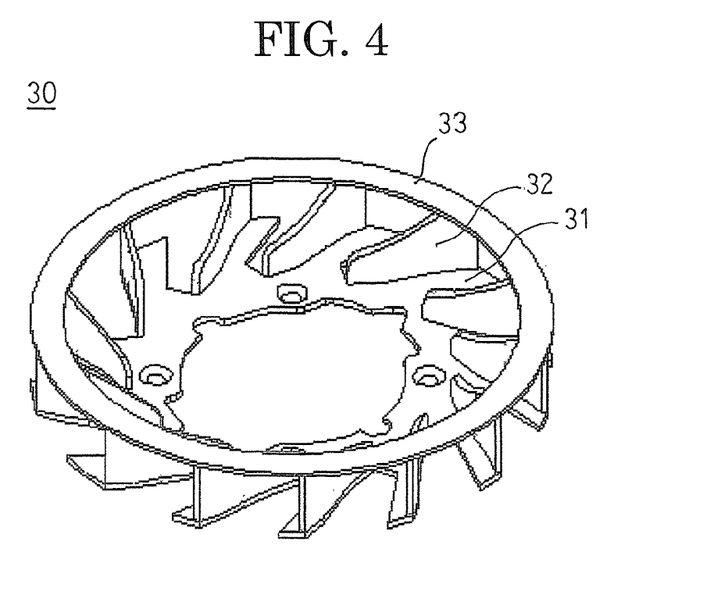
FIG. 4 is a perspective that shows a cooling fan in the automotive alternator according to Embodiment 1 of the present invention.
Figure 5:
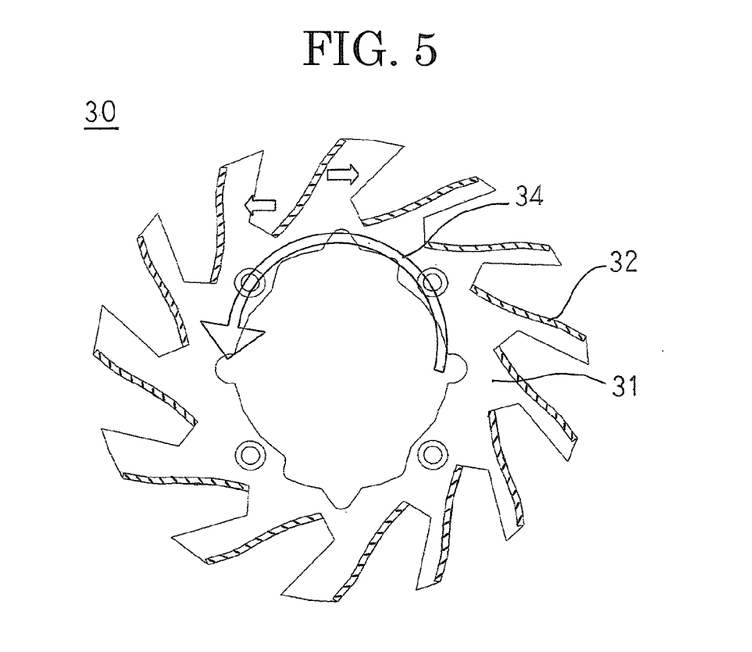
FIG. 5 is a cross section that explains a fan blade shape of the cooling fan in the automotive alternator according to Embodiment 1 of the present invention.

FIG. 1 is a longitudinal cross section that shows an automotive alternator according to Embodiment 1 of the present invention, FIG. 2 is an end elevation of a rectifying apparatus in the automotive alternator according to Embodiment 1 of the present invention viewed from an axial direction, FIG. 3 is a cross section that is taken along line III-III in FIG. 2 so as to be viewed in the direction of the arrows, FIG. 4 is a perspective that shows a cooling fan in the automotive alternator according to Embodiment 1 of the present invention, and FIG. 5 is a cross section that explains a fan blade shape of the cooling fan in the automotive alternator according to Embodiment 1 of the present invention, showing a surface in which a fan mounting side (hub side) of fan blades is sectioned in a plane that is perpendicular to a rotating shaft.

In the figures, an automotive alternator 1 that functions as an automotive rotary electric machine includes: a casing 4 that is constituted by a front bracket 2 and a rear bracket 3 that are each approximately bowl-shaped and made of aluminum; a rotating shaft 6 that is rotatably supported in the casing 4 by means of bearings 5; a pulley 7 that is fixed to an end portion of the rotating shaft 6 that projects out frontward from the casing 4; a rotor 8 that is fixed to the rotating shaft 6 and that is disposed inside the casing 4; and a stator 11 that is fixed to the casing 4 so as to surround the rotor 8.

The automotive alternator 1 also includes: a pair of slip rings 14 that are fixed to an end of the rotating shaft 6 that projects out from the rear bracket 3 and that supply electric current to the rotor 8; a pair of brushes 15 that slide on respective surfaces of the slip rings 14; a brush holder 16 that is disposed axially outside the rear bracket 3, and that accommodates the brushes 15; a rectifier 20 that is electrically connected to the stator 11, that is disposed axially outside the rear bracket 3, and that rectifies alternating currents that are generated in the stator 11 into direct current; and a voltage regulator (not shown) that is disposed axially outside the rear bracket 3, and that adjusts magnitudes of alternating-current voltages that are generated in the stator 11.

A cover 17 is mounted onto the rear bracket 3 so as to cover the brush holder 16, the rectifier 20, and the voltage regulator. A plurality of front-end air intake apertures 2a are formed on an end portion of the front bracket 2, and a plurality of front-end air discharge apertures 2b are formed on an outer circumferential portion of the front bracket 2. A plurality of rear-end air intake apertures 3a are formed on an end portion of the rear bracket 3, and a plurality of rear-end air discharge apertures 3b are formed on an outer circumferential portion of the rear bracket 3. In addition, a plurality of air intake apertures 18 are formed on an end portion of the cover 17 so as to face the rectifier 20.

The rotor 8 includes: a field coil 9 that generates magnetic flux on passage of an excitation current; a pole core 10 that is disposed so as to cover the field coil 9, and in which twelve magnetic poles are formed by the magnetic flux; and the rotating shaft 6, which is fitted centrally through the pole core 10. Cooling fans 30 are fixed to two axial end surfaces of the pole core 10 by welding, etc.

The stator 11 is manufactured by laminating magnetic steel plates annularly, for example, and includes: a stator core 12 in which thirty-six slots are arranged so as to have openings on an inner circumferential side at a uniform pitch, and that is disposed so as to be held from two axial ends by the front bracket 2 and the rear bracket 3 and surround the pole core 10 so as to ensure a uniform gap from an outer peripheral surface of the pole core 10 of the rotor 8; and a stator winding 13 that is mounted to the stator core 12.

As shown in FIGS. 2 and 3, the rectifier 20 includes: positive-side diodes 21; negative-side diodes 22; a first heatsink 23 that supports the positive-side diodes 21; and a second heatsink 26 that supports the negative-side diodes 22.

The first heatsink 23 is manufactured using a metal material that has good thermal conductivity such as aluminum, for example, has a preset axial length and a preset wall thickness, and includes: a first heatsink base 24 that is formed into a tubular body that has a cross section perpendicular to an axial direction that is a circular arc shape; and a plurality of first radiating fins 25 that are disposed so as to stand in a radial pattern at a uniform pitch circumferentially on an inner circumferential surface of the first heatsink base 24, and that each extend axially. The positive-side diodes 21 are disposed on an outer circumferential surface of the first heatsink base 24 so as to be spaced apart from each other circumferentially, and are fixed by soldering, for example.

The second heatsink 26 is manufactured using a metal material that has good thermal conductivity such as aluminum, for example, has a preset axial length and a preset wall thickness, and includes: a second heatsink base 27 that is formed into a tubular body that has a cross section perpendicular to an axial direction that is a circular arc shape; and a plurality of second radiating fins 28 that are disposed so as to stand in a radial pattern at a uniform pitch circumferentially on an outer circumferential surface of the second heatsink base 27, and that each extend axially. The negative-side diodes 22 are disposed on an inner circumferential surface of the second heatsink base 27 so as to be spaced apart from each other circumferentially, and are fixed by soldering, for example. Moreover, an inside diameter of the second heatsink base 27 is formed so as to be greater than an outside diameter of the first heatsink base 24.

The first heatsink 23 is disposed axially outside the rear bracket 3 such that the first heatsink base 24 surrounds the slip rings 14 together with the brush holder 16, and is coaxial to the rotating shaft 6. The second heatsink 26 is disposed axially outside the rear bracket 3 so as to be radially outside the first heatsink 23 and coaxial to the rotating shaft 6. Moreover, the positive-side and negative-side diodes 21 and 22 are connected so as to configure a diode bridge from three diode pairs that are formed by connecting a positive-side diode 21 and a negative-side diode 22 in series.

As shown in FIGS. 4 and 5, the cooling fans 30 are centrifugal fans, and include: flat ring-shaped mounting base plates 31 that are fixed to two axial end surfaces of the pole core 10; a plurality of fan blades 32 that are respectively disposed so as to stand on surfaces on opposite sides of the mounting base plates 31 from mounting sides, and are arranged in rows circumferentially; and flat ring-shaped fan plates 33 that are mounted on opposite sides from the mounting sides to end surfaces near trailing edges of the fan blades 32 that are arranged in rows circumferentially.

The fan blades 32 are disposed so as to stand perpendicularly on the surfaces of the mounting base plates 31. As shown in FIG. 5, the fan blades 32 are formed so as to have S-shaped cross-sectional shapes in which circular arc shapes that have centers that are positioned rearward in a direction of rotation 34 near trailing edges that are outer circumferential edges and circular arc shapes that have centers that are positioned forward in the direction of rotation 34 near leading edges that are inner circumferential edges are connected smoothly, and that displace gradually forward in the direction of rotation 34 from the trailing edges toward the leading edges. In addition, as shown in FIG. 1, fan heights h of the fan blades 32 increase gradually from the leading edges toward the inner circumferential edges of the fan plates 33.

Next, operation of the automotive alternator 1 will be explained. Moreover, the automotive alternator 1 operates as a 12-pole, 36-slot, three-phase alternator, but the number of poles and number of slots are not limited thereto.

In the automotive alternator 1, an electric current is supplied from a battery (not shown) through the brushes 15 and the slip rings 14 to the field coil 9 of the rotor 8 to generate magnetic flux. North-seeking (N) poles and South-seeking (S) poles are formed so as to alternate circumferentially on an outer circumferential surface of the pole core 10 by this magnetic flux. At the same time, rotational torque from an engine is transmitted from the output shaft of the engine to the rotating shaft 6 by means of a belt and the pulley 7 to rotate the rotor 8. Thus, rotating magnetic fields are applied to the stator winding 13 in the stator 11 to generate electromotive forces in the stator winding 13. The alternating currents that are generated by these electromotive forces are rectified by the rectifier 20, to charge the battery, or be supplied to an electrical load.

The cooling fans 30 rotate together with the rotation of the rotor 8. At a front end, cooling air is sucked through the front-end air intake apertures 2a into the front bracket 2, flows axially to a vicinity of the rotor 8, is then deflected centrifugally by the cooling fans 30, and is discharged through the front-end air discharge apertures 2b. At a rear end, cooling air is sucked through the air intake apertures 18 into the cover 17, flows between the first and second radiating fins 25 and 28 to the rear bracket 3, is sucked through the rear-end air intake apertures 3a into the rear bracket 3, flows axially to a vicinity of the rotor 8, and is then deflected centrifugally by the cooling fans 30, and is discharged through the rear-end air discharge apertures 3b.

Heat that is generated in the stator winding 13 is radiated from coil ends to the cooling air that is deflected radially outward by the cooling fans 30 and discharged through the front-end and rear-end air discharge apertures 2b and 3b, cooling the stator 11. Heat that is generated in the positive-side and negative-side diodes 21 and 22 is radiated to the cooling air that flows between the first and second radiating fins 25 and 28, cooling the rectifier 20.

Noise that is generated near the leading edges of the fan blades 32 that are close to the rotating shaft 6, which is made more pronounced by the rectifier 20 being disposed axially outside the rear bracket 3, will now be explained.

The fin lengths and fin spacings of the first and second radiating fins 25 and 28 of the first and second heatsinks 23 and 26 are different due to factors such as housing space inside the casing 4, constraints on construction of the dies that are used to manufacture them, etc. As a result, effects that the shapes of the first and second radiating fins 25 and 28 exert on flow resistance (drag coefficients) are different. If the drag coefficients are different, the speed of the cooling air that flows between the first and second radiating fins 25 and 28 is different since the speed of the cooling air changes such that flow resistance is equal. The cooling air that has flowed between the first and second radiating fins 25 and 28 must merge in the vicinity of the rear-end air intake apertures 3a. When cooling air that is at different speeds merges, shearing forces arise due to the speed difference, giving rise to turbulence in the cooling air. The turbulent cooling air is then sucked through the rear-end air intake apertures 3a into the rear bracket 3, and is sucked into the cooling fans 30. Greater pressure fluctuations are generated near the leading edges of the fan blades 32 in particular by the turbulence in the cooling air, generating loud noise.

If outer circumferential edge portions of the rear-end air intake apertures 3a are positioned at identical positions to or inside the second heatsink base 27 in relation to the radial direction, the cooling air that has flowed between the second radiating fins 28 collides with the end surface of the rear bracket 3, changing the direction of flow radially inward. In addition, if a gap between the end surface of the second heatsink 26 and the rear bracket 3 is narrow, the drag coefficient in the gap in question is increased. Thus, flow velocity of the cooling air that collides with the end surface of the rear bracket 3, has its direction of flow changed radially inward, and flows through the gap in question, is increased. The speed difference between the cooling air that has flowed through the gap in question and the cooling air that has flowed between the first radiating fins 25 is thereby increased, giving rise to greater turbulence in the merged cooling air. Consequently, noise that is generated near the leading edges of the cooling fans 30 is further increased.

Next, a relationship between noise that is generated near the leading edges of the fan blades and the cross-sectional shape of the fan blades will be explained. Moreover, the cross-sectional shape of the fan blades is a surface shape when cut in a plane that is perpendicular to a central axis of the rotating shaft 6.

First, a case in which the cross-sectional shape of the fan blades that displaces gradually forward in the direction of rotation 34 from the trailing edge, which is the outer circumferential edge, toward the leading edge, which is the inner circumferential edge, is a linear cross-sectional shape, and a case in which it is a circular arc-shaped cross-sectional shape that has a center that is positioned rearward in the direction of rotation 34 will be compared.

An angle on the air inflow side of fan blades that have a circular arc-shaped cross-sectional shape relative to a tangent of a circle that is centered around the central axis of the rotating shaft 6 that passes through the leading edge is increased compared to fan blades that have a linear cross-sectional shape. Thus, in fan blades that have a circular arc-shaped cross-sectional shape, cooling air cannot flow in from the leading end smoothly, and delaminated regions are formed on negative pressure surface sides (rearward in the direction of rotation 34) near the leading edges, making noise more likely to be generated due to fluctuations in the size of the delaminated regions and turbulence inside the delaminated regions. If there is turbulence in the cooling air flowing in near the leading edge, the fluctuations in the size of the delaminated regions and the turbulence inside the delaminated regions are amplified, increasing the noise.

However, an angle on the air outflow side of fan blades that have a circular arc-shaped cross-sectional shape relative to a tangent of a circle that is centered around the central axis of the rotating shaft 6 that passes through the trailing edge is reduced compared to fan blades that have a linear cross-sectional shape. Thus, the occurrence of delamination on the negative pressure surface sides (rearward in the direction of rotation 34) at the trailing edges of the fan blades can be suppressed in fan blades that have a circular arc-shaped cross-sectional shape. Flow noise that is generated in the delaminated regions in question can be suppressed particularly during high-speed rotation in fan blades that have a circular arc-shaped cross-sectional shape.

The fan blades 32 of the present cooling fans 30 are formed so as to have S-shaped cross-sectional shapes in which trailing edge circular arc shapes that have centers that are positioned rearward in a direction of rotation 34 and leading edge circular arc shapes that have centers that are positioned forward in the direction of rotation 34 are connected smoothly.

Thus, the angle on the air inflow side of the fan blades 32 relative to a tangent of a circle that is centered around the central axis of the rotating shaft 6 that passes through the leading edge is reduced compared to fan blades that have a linear cross-sectional shape. Because cooling air can thereby flow in smoothly from near the leading edges of the fan blades 32, and delaminated regions are less likely to be formed on the negative pressure surface sides near the leading edges, the generation of noise near the leading edges of the fan blades 32 is suppressed.

Because delaminated regions are less likely to be formed on the negative pressure surface sides near the trailing edges of the fan blades 32 in a similar or identical manner to that of the fan blades that have a single circular arc-shaped cross-sectional shape, the generation of noise near the trailing edge of the fan blades 32 is suppressed.

The cooling fans 30 can thereby reduce noise that is generated near the leading edges and near the trailing edges of the fan blades 32.

Now, the cooling air flows in from near the leading edges of the fan blades 32 over the surfaces of the mounting base plates 31, and also flows in from between the leading edges of the fan blades 32 and the inner circumferential edges of the fan plates 33. Thus, the cooling air that flows from between the leading edges of the fan blades 32 and the inner circumferential edges of the fan plates 33 has an axial flow that is sucked in through the rear-end air intake apertures 3a, and is changed to a radial flow as it flows in from between the leading edges of the fan blades 32 and the inner circumferential edges of the fan plates 33. Delaminated regions, which are factors in noise generation, are thereby also formed on negative pressure surface sides between the leading edges of the fan blades 32 and the inner circumferential edges of the fan plates 33 in addition to the negative pressure surface sides of the fan blades 32 near the trailing edges.

Because the fan height h of the fan blades 32 in the cooling fans 30 increases gradually from the leading edges toward the inner circumferential edges of the fan plates 33, the cooling air flows in from between the leading edges of the fan blades 32 and the inner circumferential edges of the fan plates 33 in a state in which some of the direction of flow is oriented in a radial direction. Thus, delaminated regions that form on negative pressure surface sides between the leading edges of the fan blades 32 and the inner circumferential edges of the fan plates 33 and turbulence in the delaminated regions are reduced, enabling noise to be reduced.

Thus, according to Embodiment 1, the formation of delaminated regions on the negative pressure surface sides of the fan blades 32 near the trailing edges and of turbulence inside the delaminated regions, which are noise sources, can be suppressed, enabling noise that is generated near the leading edges of the fan blades 32 to be reduced.

Because the flat ring-shaped fan plates 33 are mounted to the end surfaces on opposite sides from the mounting sides near the trailing edges of the fan blades 32 that are arranged in rows circumferentially, the generation of noise that has frequencies that are integral multiples of the rotational frequency that arises due to the end surfaces of the fan blades 32 chopping the air can be suppressed.

Moreover, in Embodiment 1 above, fan blades are formed so as to have S-shaped cross-sectional shapes in which circular arc shapes that have centers that are positioned rearward in a direction of rotation near trailing edges and circular arc shapes that have centers that are positioned forward in the direction of rotation near leading edges are connected smoothly, and that displace gradually forward in the direction of rotation from the trailing edges toward the leading edges, but fan blades need only be formed so as to have S-shaped cross-sectional shapes in which arc shapes that are convex forward in the direction of rotation near trailing edges and arc shapes that are convex rearward in the direction of rotation near leading edges are connected smoothly, and that displace gradually forward in the direction of rotation from the trailing edges toward the leading edges. The arc shapes that are convex forward in the direction of rotation near the trailing edges may also be constituted by single circular arc shapes that have centers that are positioned rearward in the direction of rotation, or may also be constituted by a plurality of circular arc shapes that have centers that are positioned rearward in the direction of rotation, for example. Similarly, the arc shapes that are convex rearward in the direction of rotation near the leading edges may also be constituted by single circular arc shapes that have centers that are positioned forward in the direction of rotation, or may also be constituted by a plurality of circular arc shapes that have centers that are positioned forward in the direction of rotation.

In Embodiment 1 above, positive-side diodes are mounted to a first heatsink that is disposed on a radially inner side and negative-side diodes are mounted to a second heatsink that is disposed on a radially outer side, but positive-side diodes may also be mounted to a second heatsink that is disposed on a radially outer side and negative-side diodes mounted to a first heatsink that is disposed on a radially inner side.

In Embodiment 1, a case in which there are fan plates 33 has been explained, but if indentations and protrusions on the bracket surfaces that face toward the tips of the fans are small, fan plates 33 may not be mounted since the noise reducing effects of the fan plates 33 are small. In such cases, delaminated regions that form on negative pressure surface sides from the leading edges of the fan blades 32 to the fan tips and turbulence in the delaminated regions can also be reduced, enabling noise to be reduced, by forming S-shaped cross-sectional shapes in which circular arc shapes that have centers that are positioned rearward in a direction of rotation 34 near trailing edges and circular arc shapes that have centers that are positioned forward in the direction of rotation 34 near leading edges are connected smoothly, and that displace gradually forward in the direction of rotation 34 from the trailing edges toward the leading edges, and increasing the fan height h of the fan blades 32 gradually from the leading edges toward the fan tips.

In Embodiment 1 above, a case in which first and second heatsink bases are formed such that cross sections perpendicular to an axial direction are circular arc shapes has been explained, but the first and second heatsink bases may be formed such that cross sections perpendicular to the axial direction are polygonal or U-shaped arc shapes.

In Embodiment 1 above, a case in which positive-side diodes are mounted onto an outer circumferential surface of a first heatsink base and negative-side diodes are mounted onto an inner circumferential surface of a second heatsink base that is disposed on an outer circumferential side of the first heatsink base has been explained, but positive-side diodes may be mounted on an inner circumferential surface of the first heatsink base and negative-side diodes mounted onto an outer circumferential surface of a second heatsink base that is disposed on an outer circumferential side of the first heatsink base.

Embodiment 2

Figure 6:
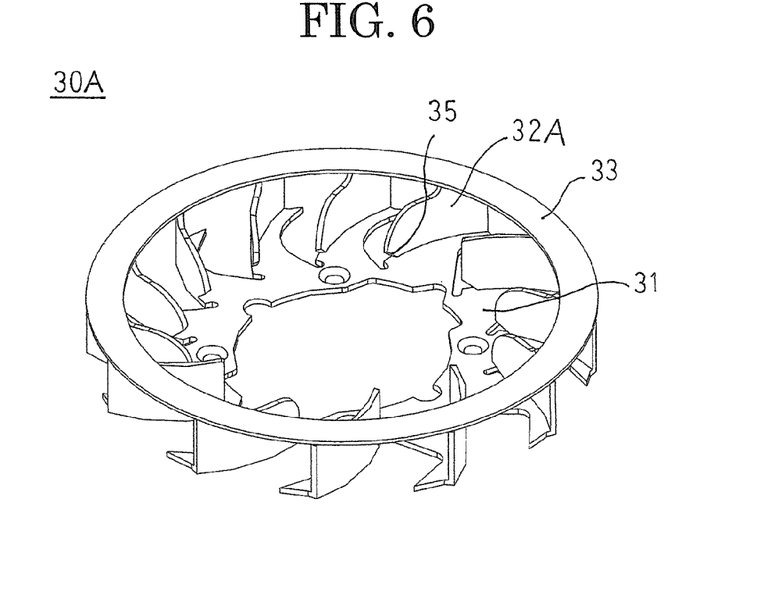
FIG. 6 is a perspective that shows a cooling fan in an automotive alternator according to Embodiment 2 of the present invention.

FIG. 6 is a perspective that shows a cooling fan in an automotive alternator according to Embodiment 2 of the present invention.

As shown in FIG. 6, cooling fans 30A include: flat ring-shaped mounting base plates 31 that are fixed to two axial end surfaces of the pole core 10; a plurality of fan blades 32A that are respectively disposed so as to stand on surfaces on opposite sides of the mounting base plates 31 from the mounting sides, and are arranged in rows circumferentially; and flat ring-shaped fan plates 33 that are mounted on opposite sides from the mounting sides to end surfaces near trailing edges of the fan blades 32A that are arranged in rows circumferentially.

The fan blades 32A are disposed so as to stand perpendicularly on the surfaces of the mounting base plates 31. The fan blades 32A are formed so as to have circular arc-shaped cross-sectional shapes that have centers that are positioned rearward in a direction of rotation, that displace gradually forward in the direction of rotation from trailing edges that are outer circumferential edges toward leading edges that are inner circumferential edges. Notches 35 are formed by cutting away in a triangular shape portions of the leading edges of the fan blades 32A that are raised from the mounting base plates 31. In addition, fan heights h of the fan blades 32A increase gradually from the leading edges toward the inner circumferential edges of the fan plates 33.

Moreover, Embodiment 2 is configured in a similar or identical manner to that of Embodiment 1 above except that the cooling fans 30A are used instead of the cooling fans 30.

As described above, if fan blades have a circular arc-shaped cross-sectional shape that is convex forward in the direction of rotation, the angle on the air inflow side relative to the tangent of a circle that is centered around the central axis of the rotating shaft 6 that passes through the leading edge is increased. Thus, the cooling air cannot flow smoothly from the front end of the fan blades, and delaminated regions are formed on negative pressure surfaces (rearward in the direction of rotation) near the leading edges.

In Embodiment 2, because the notches 35 are formed on the portions of the leading edges of the fan blades 32A that are raised from the mounting base plates 31, a portion of the cooling air that flows over the surface of the mounting base plates 31 and flows in from near the leading edges of the fan blades 32A passes through the notches 35 and flows onto the negative pressure surface sides (rearward in the direction of rotation). This cooling air that flows onto the negative pressure surface sides from the positive pressure surface sides reduces the delaminated regions that are formed on the negative pressure surface sides of the fan blades 32A near the leading edges as a result of the circular arc-shaped cross-sectional shape that is convex forward in the direction of rotation. By this reduction of the delaminated regions, fluctuations in the size of the delaminated regions on the negative pressure surface sides near the leading edges and turbulence inside the delaminated regions, which are noise sources, are reduced, enabling noise that is generated near the leading edges to be reduced.

In Embodiment 2, because the fan blades 32A are also formed so as to have a circular arc-shaped cross-sectional shape that is convex forward in the direction of rotation, noise that is generated near the trailing edges of the fan blades 32A can be reduced. Because the fan height h of the fan blades 32A increases gradually from the leading edges toward the inner circumferential edges of the fan plates 33, noise that results from cooling air flowing in from between the leading edges of the fan blades 32A and the inner circumferential edges of the fan plates 33 can be reduced. In addition, because the flat ring-shaped fan plates 33 are mounted to the end surfaces on opposite sides from the mounting sides near the trailing edges of the fan blades 32A that are arranged in rows circumferentially, the generation of noise that arises due to the end surfaces of the fan blades 32A chopping the air can be suppressed.

Moreover, in Embodiment 2 above, fan blades are formed so as to have single circular arc-shaped cross-sectional shapes that have centers that are positioned rearward in a direction of rotation, that displace gradually forward in the direction of rotation from the trailing edges toward the leading edges, but fan blades need only be formed so as to have arc-shaped cross-sectional shapes that are convex forward in the direction of rotation that displace gradually forward in the direction of rotation from the trailing edges toward the leading edges. The arc shapes that are convex forward in the direction of rotation may also be constituted by a plurality of circular arc shapes that have centers that are positioned rearward in the direction of rotation, for example.

In Embodiment 2 above, notches are formed by cutting away in a triangular shape portions of leading edges of fan blades that are raised from a mounting base plate, but the shape of the notches is not limited to a triangular shape, the portions of the leading edges of the fan blades that are raised from the mounting base plate needing only to communicate from the positive pressure to the negative pressure sides, and may also be cut away in a quadrangular shape or a semicircular shape, for example.

In Embodiment 2, a case in which there are fan plates 33 has been explained, but if indentations and protrusions on the bracket surfaces that face toward the tips of the fans are small, fan plates 33 may not be mounted since the noise reducing effects of the fan plates 33 are small. In such cases, delaminated regions that form on negative pressure surface sides from the leading edges of the fan blades 32A to the fan tips and turbulence in the delaminated regions can also be reduced, enabling noise to be reduced, by forming S-shaped cross-sectional shapes in which circular arc shapes that have centers that are positioned rearward in a direction of rotation 34 near trailing edges and circular arc shapes that have centers that are positioned forward in the direction of rotation 34 near leading edges are connected smoothly, and that displace gradually forward in the direction of rotation 34 from the trailing edges toward the leading edges, and increasing the fan height h of the fan blades 32A gradually from the leading edges toward the fan tips.

Moreover, in FIG. 6, fan blades that are not inclined toward fan tips from leading edges are included. If there are fan blades that are not inclined, noise is increased under the influence of those fan blades, but the noise reducing effects of the notches described above are not nullified.

Embodiment 3

Figure 7:
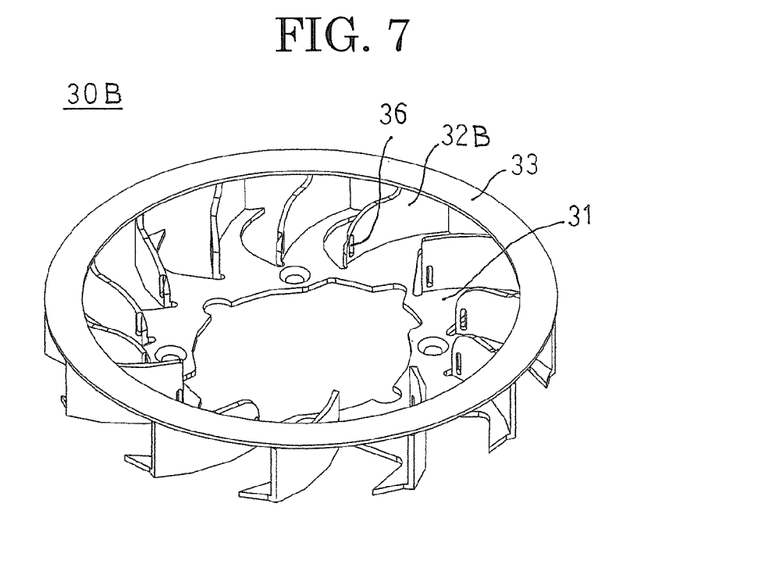
FIG. 7 is a perspective that shows a cooling fan in an automotive alternator according to Embodiment 3 of the present invention.

FIG. 7 is a perspective that shows a cooling fan in an automotive alternator according to Embodiment 3 of the present invention.

As shown in FIG. 7, cooling fans 30B include: flat ring-shaped mounting base plates 31 that are fixed to two axial end surfaces of the pole core 10; a plurality of fan blades 32B that are respectively disposed so as to stand on surfaces on opposite sides of the mounting base plates 31 from the mounting sides, and are arranged in rows circumferentially; and flat ring-shaped fan plates 33 that are mounted on opposite sides from the mounting sides to end surfaces near trailing edges of the fan blades 32B that are arranged in rows circumferentially.

The fan blades 32B are disposed so as to stand perpendicularly on the surfaces of the mounting base plates 31. The fan blades 32B are formed so as to have circular arc-shaped cross-sectional shapes that have centers that are positioned rearward in a direction of rotation, that displace gradually forward in the direction of rotation from trailing edges that are outer circumferential edges toward leading edges that are inner circumferential edges. Rectangular penetrating apertures 36 are formed so as to pass through near the leading edges of the fan blades 32B so as also to be near the mounting base plates 31. In addition, fan heights h of the fan blades 32B increase gradually from the leading edges toward the inner circumferential edges of the fan plates 33.

Moreover, Embodiment 3 is configured in a similar or identical manner to that of Embodiment 1 above except that the cooling fans 30B are used instead of the cooling fans 30.

In Embodiment 3, because the penetrating apertures 36 are formed near the leading edges of the fan blades 32B so as also to be near the mounting base plates 31, a portion of the cooling air that flows over the surface of the mounting base plates 31 and flows in from near the leading edges of the fan blades 32B passes through the penetrating apertures 36 and flows onto the negative pressure surface sides (rearward in the direction of rotation). This cooling air that flows onto the negative pressure surface sides from the positive pressure surface sides reduces the delaminated regions that are formed on the negative pressure surface sides of the fan blades 32B near the leading edges as a result of the circular arc-shaped cross-sectional shape that is convex forward in the direction of rotation. By this reduction of the delaminated regions, fluctuations in the size of the delaminated regions on the negative pressure surface sides near the leading edges and turbulence inside the delaminated regions, which are noise sources, are reduced, enabling noise that is generated near the leading edges to be reduced.

In Embodiment 3, because the fan blades 32B are also formed so as to have a circular arc-shaped cross-sectional shape that is convex forward in the direction of rotation, noise that is generated near the trailing edges of the fan blades 32B can be reduced. Because the fan height h of the fan blades 32B increases gradually from the leading edges toward the inner circumferential edges of the fan plates 33, noise that results from cooling air flowing in from between the leading edges of the fan blades 32B and the inner circumferential edges of the fan plates 33 can be reduced. In addition, because the flat ring-shaped fan plates 33 are mounted to the end surfaces on opposite sides from the mounting sides near the trailing edges of the fan blades 32B that are arranged in rows circumferentially, the generation of noise that arises due to the end surfaces of the fan blades 32B chopping the air can be suppressed.

Moreover, in Embodiment 3 above, fan blades are formed so as to have single circular arc-shaped cross-sectional shapes that have centers that are positioned rearward in a direction of rotation, that displace gradually forward in the direction of rotation from the trailing edges toward the leading edges, but fan blades need only be formed so as to have arc-shaped cross-sectional shapes that are convex forward in the direction of rotation that displace gradually forward in the direction of rotation from the trailing edges toward the leading edges. The arc shapes that are convex forward in the direction of rotation may also be constituted by a plurality of circular arc shapes that have centers that are positioned rearward in the direction of rotation, for example.

In Embodiment 3, a case in which there are fan plates 33 has been explained, but if indentations and protrusions on the bracket surfaces that face toward the tips of the fans are small, fan plates 33 may not be mounted since the noise reducing effects of the fan plates 33 are small. In such cases, delaminated regions that form on negative pressure surface sides from the leading edges of the fan blades 32B to the fan tips and turbulence in the delaminated regions can also be reduced, enabling noise to be reduced, by forming S-shaped cross-sectional shapes in which circular arc shapes that have centers that are positioned rearward in a direction of rotation 34 near trailing edges and circular arc shapes that have centers that are positioned forward in the direction of rotation 34 near leading edges are connected smoothly, and that displace gradually forward in the direction of rotation 34 from the trailing edges toward the leading edges, and increasing the fan height h of the fan blades 32B gradually from the leading edges toward the fan tips.

Moreover, in FIG. 7, fan blades that are not inclined toward fan tips from leading edges are included. If there are fan blades that are not inclined, noise is increased under the influence of those fan blades, but the noise reducing effects of the penetrating apertures described above are not nullified.

In Embodiment 3 above, rectangular penetrating apertures are formed on the fan blades, but the shape of the penetrating apertures is not limited to a rectangular shape, needing only to communicate between the positive pressure sides and the negative pressure sides of the fan blades, and may also be a circular shape, for example. Furthermore, the number of penetrating apertures is not limited to one.

In Embodiment 3 above, the penetrating apertures are formed near the leading edges of the fan blades so as also to be near the mounting base plates, but it is not absolutely necessary for the penetrating apertures to be formed near the leading edges of the fan blades so as also to be near the mounting base plates, provided that they communicate from the positive pressure sides to the negative pressure sides near the leading edges of the fan blades.

In Embodiments 2 and 3 above, notches or penetrating apertures are formed on fan blades that have arc-shaped cross-sectional shapes that displace gradually forward in a direction of rotation from the trailing edges toward the leading edges and are convex forward in the direction of rotation, but notches or penetrating apertures may also be formed on fan blades according to Embodiment 1 that have S-shaped cross-sectional shapes in which an arc shape near a trailing edge that is convex forward in the direction of rotation and an arc shape near the leading edge that is convex rearward in the direction of rotation are connected smoothly, that displace gradually forward in the direction of rotation from the trailing edges toward the leading edges.

Embodiment 4

Figure 8:
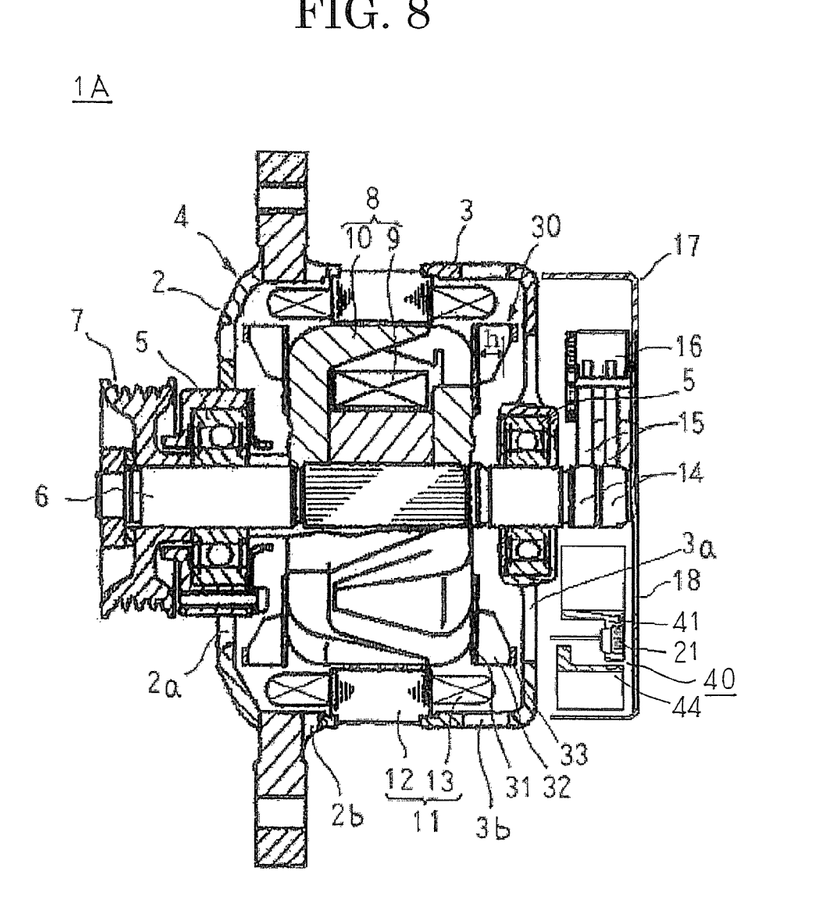
FIG. 8 is a longitudinal cross section that shows an automotive alternator according to Embodiment 4 of the present invention.
Figure 9:
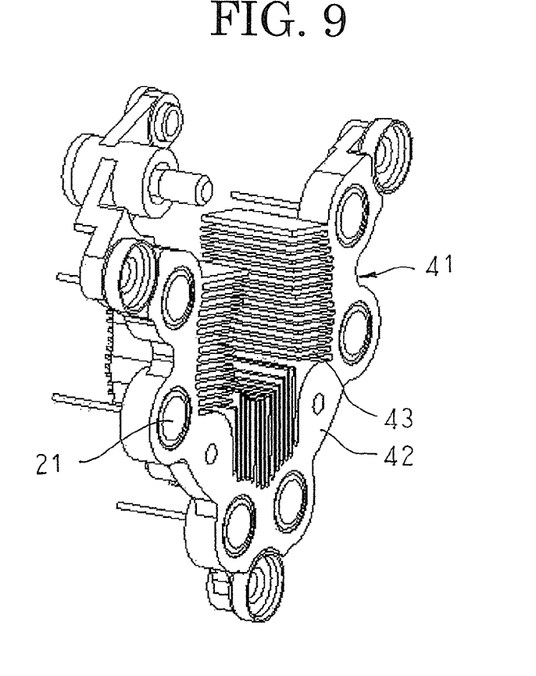
FIG. 9 is an oblique projection that shows a first heatsink in the automotive alternator according to Embodiment 4 of the present invention.
Figure 10:
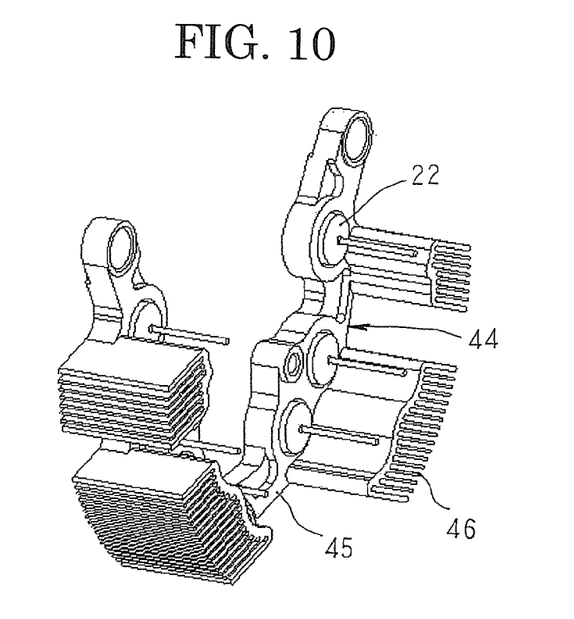
FIG. 10 is an oblique projection that shows a second heatsink in the automotive alternator according to Embodiment 4 of the present invention.

FIG. 8 is a longitudinal cross section that shows an automotive alternator according to Embodiment 4 of the present invention, FIG. 9 is an oblique projection that shows a first heatsink in the automotive alternator according to Embodiment 4 of the present invention, and FIG. 10 is an oblique projection that shows a second heatsink in the automotive alternator according to Embodiment 4 of the present invention.

In FIGS. 8 through 10, rectifiers 40 include: positive-side diodes 21; negative-side diodes 22; a first heatsink 41 that supports the positive-side diodes 21; and a second heatsink 44 that supports the negative-side diodes 22.

The first heatsink 41 is manufactured using a metal material that has good thermal conductivity such as aluminum, for example, has a preset axial length and wall thickness, and includes: a first heatsink base 42 that is formed so as to have a cross section perpendicular to an axial direction that is an arc shape; and a plurality of first radiating fins 43 that are disposed so as to stand parallel to each other on an inner circumferential surface of the first heatsink base 42, and that each extend axially. The positive-side diodes 21 are disposed on the first heatsink base 24 so as to be spaced apart from each other circumferentially, and are fixed by press-fitting, for example.

The second heatsink 42 is manufactured using a metal material that has good thermal conductivity such as aluminum, for example, has a preset axial length and wall thickness, and includes: a second heatsink base 45 that is formed so as to have a cross section perpendicular to an axial direction that is an arc shape; and a plurality of second radiating fins 46 that are disposed so as to stand parallel to each other on an outer circumferential surface of the second heatsink base 45, and that each extend axially. The negative-side diodes 22 are disposed on the second heatsink base 45 so as to be spaced apart from each other circumferentially, and are fixed by press-fitting, for example.

The first heatsink 41 and the second heatsink 44 are disposed axially outside a rear bracket 3 such that the first heatsink base 42 and the second heatsink base 45 are spaced apart in the axial direction so as to face a brush holder 16 from an opposite side of a rotating shaft 6. The first heatsink 41 is disposed such that a lead extracting direction of the positive-side diodes 21 is oriented toward a front end, and the second heatsink 44 is disposed at the front end of the first heatsink 41 such that a lead extracting direction of the negative-side diodes 22 is oriented toward a rear end. Moreover, the positive-side and negative-side diodes 21 and 22 are connected so as to configure a diode bridge from six diode pairs that are formed by connecting a positive-side diode 21 and a negative-side diode 22 in series.

Although not shown in detail, seventy-two slots are disposed so as to have openings on an inner circumferential side of a stator core 12, and a stator winding 13 is constituted by two three-phase alternating-current windings. The two three-phase alternating-current windings are respectively rectified by the rectifiers 40. An automotive alternator 1A that is configured in this manner operates as a 12-pole, 72-slot, three-phase alternator.

Moreover, the rest of the configuration is formed in a similar or identical manner to that of Embodiment 1 above.

In an automotive alternator 1A that is configured in this manner, cooling air is sucked through the air intake apertures 18 into the cover 17 at the rear end due to rotation of a cooling fan 30, flows between the first and second radiating fins 43 and 46 to the rear bracket 3, is sucked through the rear-end air intake apertures 3a into the rear bracket 3, and flows axially to a vicinity of the rotor 8. The cooling air that has flowed to the vicinity of the rotor 8 is then deflected centrifugally by the cooling fan 30, and is discharged through the rear-end air discharge apertures 3b. At this point, turbulence arises in the cooling air as a result of the cooling air that has passed between the first radiating fins 43 and the cooling air that has passed between the second radiating fins 46 merging.

In Embodiment 4, because the cooling fan 30 is used, noise that is generated near the leading edges of the fan blades 32 as a result of turbulence in the cooling air can also be reduced in a similar manner to Embodiment 1 above.

Now, in Embodiment 4, the cooling fan 30 is used, but it goes without saying that a cooling fan 30A or 30B may be used instead of the cooling fan 30.

In each of the above embodiments, an automotive alternator has been explained, but the automotive rotary electric machine is not limited to automotive alternators, and may also be an automotive motor-generator, for example.

In each of the above embodiments, cases in which the lead extracting directions of the positive-side diodes and the negative-side diodes are opposite directions have been explained, but the lead extracting directions of the positive-side diodes and the negative-side diodes may be identical directions.

The invention claimed is:

1. An automotive rotary electric machine comprising:
a casing;
a rotor that is fixed to a rotating shaft that is rotatably supported by said casing, said rotor being disposed inside said casing;
a stator that is supported by said casing, and that is disposed so as to surround said rotor;

a rectifier that is disposed outside a first axial end of said casing; and
a cooling fan that is fixed to an end surface at a first axial end of said rotor,
said rectifier comprising:
a first heatsink comprising:
an arc-shaped first heatsink base that is disposed so as to be coaxial to said rotating shaft; and
a plurality of first radiating fins that are arranged in a row circumferentially such that each extends radially inward from an inner circumferential surface of said first heatsink base and also extends axially;
a second heatsink comprising:
an arc-shaped second heatsink base that is disposed so as to spaced apart from said first heatsink base so as to be coaxial to said rotating shaft; and
a plurality of second radiating fins that are arranged in a row circumferentially such that each extends radially outward from an outer circumferential surface of said second heatsink base and also extends axially;
a plurality of first diodes that are mounted onto said first heatsink base; and
a plurality of second diodes that are mounted onto said second heatsink base;
an air intake aperture being formed on an end surface at said first axial end of said casing;
an air discharge aperture being formed on an outer circumferential portion of said casing; and
said cooling fan rotating together with rotation of said rotor such that cooling air flows between said first radiating fins and between said second radiating fins, flows through said air intake aperture into said casing, and is subsequently deflected centrifugally and discharged through said air discharge aperture,
wherein said cooling fan comprises:
a flat ring-shaped mounting base plate that is fixed to said rotor; and
a plurality of fan blades that are respectively arranged in a row circumferentially such that each stands on a surface of said mounting base plate, and that each have an S-shaped cross-sectional shape that displaces gradually forward in a direction of rotation from a trailing edge that is an outer circumferential edge toward a leading edge that is an inner circumferential edge, and in which an arc shape near said trailing edge that is convex forward in said direction of rotation and an arc shape near said leading edge that is convex rearward in said direction of rotation are connected smoothly.

2. An automotive rotary electric machine according to claim 1, wherein said fan blades are formed such that fan height increases gradually from a leading end toward a trailing edge.

3. An automotive rotary electric machine comprising:
a casing;
a rotor that is fixed to a rotating shaft that is rotatably supported by said casing, said rotor being disposed inside said casing;
a stator that is supported by said casing, and that is disposed so as to surround said rotor;
a rectifier that is disposed outside a first axial end of said casing; and
a cooling fan that is fixed to an end surface at a first axial end of said rotor,
said rectifier comprising:
a first heatsink comprising:
an arc-shaped first heatsink base that is disposed so as to be coaxial to said rotating shaft; and
a plurality of first radiating fins that are arranged in a row circumferentially such that each extends radially inward from an inner circumferential surface of said first heatsink base and also extends axially;
a second heatsink comprising:
an arc-shaped second heatsink base that is disposed so as to be spaced apart from said first heatsink base so as to be coaxial to said rotating shaft; and
a plurality of second radiating fins that are arranged in a row circumferentially such that each extends radially outward from an outer circumferential surface of said second heatsink base and also extends axially;
a plurality of first diodes that are mounted onto said first heatsink base; and
a plurality of second diodes that are mounted onto said second heatsink base;
an air intake aperture being formed on an end surface at said first axial end of said casing;
an air discharge aperture being formed on an outer circumferential portion of said casing; and
said cooling fan rotating together with rotation of said rotor such that cooling air flows between said first radiating fins and between said second radiating fins, flows through said air intake aperture into said casing, and is subsequently deflected centrifugally and discharged through said air discharge aperture,
wherein said cooling fan comprises:
a flat ring-shaped mounting base plate that is fixed to said rotor;
a plurality of fan blades that are respectively arranged in a row circumferentially such that each stands on a surface of said mounting base plate, and that each have an arc-shaped cross-sectional shape that displaces gradually forward in a direction of rotation from a trailing edge that is an outer circumferential edge toward a leading edge that is an inner circumferential edge, and that is convex forward in said direction of rotation; and
a notch that is formed on a portion at a leading end of said fan blades that is raised from said mounting base plate.

4. An automotive rotary electric machine according to claim 3, wherein said fan blades are formed such that fan height increases gradually from a leading end toward a trailing edge.

5. An automotive rotary electric machine comprising:
a casing;
a rotor that is fixed to a rotating shaft that is rotatably supported by said casing, said rotor being disposed inside said casing;
a stator that is supported by said casing, and that is disposed so as to surround said rotor;
a rectifier that is disposed outside a first axial end of said casing; and
a cooling fan that is fixed to an end surface at a first axial end of said rotor,
said rectifier comprising:
a first heatsink comprising:
an arc-shaped first heatsink base that is disposed so as to be coaxial to said rotating shaft; and
a plurality of first radiating fins that are arranged in a row circumferentially such that each extends radially inward from an inner circumferential surface of said first heatsink base and also extends axially;
a second heatsink comprising:
an arc-shaped second heatsink base that is disposed so as to be spaced apart from said first heatsink base so as to be coaxial to said rotating shaft; and a plurality of second radiating fins that are arranged in a row circumferentially such that each extends radially outward from an outer circumferential surface of said second heatsink base and also extends axially;

a plurality of first diodes that are mounted onto said first heatsink base; and a plurality of second diodes that are mounted onto said second heatsink base;

an air intake aperture being formed on an end surface at said first axial end of said casing;

an air discharge aperture being formed on an outer circumferential portion of said casing; and said cooling fan rotating together with rotation of said rotor such that cooling air flows between said first radiating fins and between said second radiating fins, flows through said air intake aperture into said casing, and is subsequently deflected centrifugally and discharged through said air discharge aperture, wherein said cooling fan comprises:

a flat ring-shaped mounting base plate that is fixed to said rotor;

a plurality of fan blades that are respectively arranged in a row circumferentially such that each stands on a surface of said mounting base plate, and that each have an arc-shaped cross-sectional shape that displaces gradually forward in a direction of rotation from a trailing edge that is an outer circumferential edge toward a leading edge that is an inner circumferential edge, and that is convex forward in said direction of rotation; and a penetrating aperture that is formed near a leading end of said fan blades.

6. An automotive rotary electric machine according to claim 5, wherein said fan blades are formed such that fan height increases gradually from a leading end toward a trailing edge.

* * * * *